No. 642,656. Patented Feb. 6, 1900.
J. H. & E. L. WHITE.
APPARATUS FOR MAKING PAPER TUBES.
(Application filed Oct. 26, 1899.)
(No Model.) 10 Sheets—Sheet 1.

Witnesses
Sidney P. Hollingsworth
A. M. Parkins.

Inventors:
JOHN H. WHITE,
EDWARD L. WHITE,
by Baldwin Davidson & Wight,
Attorneys No. 642,656. Patented Feb. 6, 1900.
J. H. & E. L. WHITE.
APPARATUS FOR MAKING PAPER TUBES.
(Application filed Oct. 26, 1899.)
(No Model.) 10 Sheets—Sheet 3.

Witnesses,
Sidney P. Hollingworth
A. M. Parkins

Inventors,
JOHN H. WHITE,
EDWARD L. WHITE
by Baldwin Davidson & Wright
Attorneys.

No. 642,656. Patented Feb. 6, 1900.
J. H. & E. L. WHITE.
APPARATUS FOR MAKING PAPER TUBES.
(Application filed Oct. 26, 1899.)

(No Model.) 10 Sheets—Sheet 4.

Inventors
JOHN H. WHITE,
EDWARD L. WHITE,

No. 642,656. Patented Feb. 6, 1900.
J. H. & E. L. WHITE.
APPARATUS FOR MAKING PAPER TUBES.
(Application filed Oct. 26, 1899.)
(No Model.) 10 Sheets—Sheet 7.

Witnesses
Sidney P. Hollingworth
A. M. Parkins.

Inventors
JOHN H. WHITE,
EDWARD L. WHITE,
by Baldwin Davidson & Wright
Attorneys.

No. 642,656. Patented Feb. 6, 1900.
J. H. & E. L. WHITE.
APPARATUS FOR MAKING PAPER TUBES.
(Application filed Oct. 26, 1899.)
(No Model.) 10 Sheets—Sheet 8.

Witnesses:

Inventors,
JOHN H. WHITE,
EDWARD L. WHITE,
by Baldwin Davidson & Wright
Attorneys.

THE NORRIS PETERS CO., PHOTO-LITHO., WASHINGTON, D. C.

No. 642,656. Patented Feb. 6, 1900.
J. H. & E. L. WHITE.
APPARATUS FOR MAKING PAPER TUBES.
(Application filed Oct. 26, 1899.)

(No Model.) 10 Sheets—Sheet 9.

Inventors,
JOHN H. WHITE,
EDWARD L. WHITE
by Baldwin Davidson & Wight
Attorneys

No. 642,656. Patented Feb. 6, 1900.
J. H. & E. L. WHITE.
APPARATUS FOR MAKING PAPER TUBES.
(Application filed Oct. 26, 1899.)
(No Model.) 10 Sheets—Sheet 10.

Witnesses:
Sidney P. Hollingsworth
A. M. Parkins.

Inventors,
JOHN H. WHITE,
EDWARD L. WHITE,
by Baldwin Davidson & Wight
Attorneys

UNITED STATES PATENT OFFICE.

JOHN H. WHITE AND EDWARD L. WHITE, OF WASHINGTON, DISTRICT OF COLUMBIA.

APPARATUS FOR MAKING PAPER TUBES.

SPECIFICATION forming part of Letters Patent No. 642,656, dated February 6, 1900.

Application filed October 26, 1899. Serial No. 734,841. (No model.)

*To all whom it may concern:*

Be it known that we, JOHN HOWARD WHITE and EDWARD LOWRY WHITE, citizens of the United States, residing at Washington city, in the District of Columbia, have invented certain new and useful Improvements in Apparatus for Making Paper Tubes, of which the following is a specification.

The present invention is designed to produce in the cheapest and most efficient manner paper tubes to be used for drinking-straws or other kindred purposes. We attain this end by employing a process consisting of the successive steps of passing a continuous strip or ribbon of paper through guides of proper form to give it the shape desired, whether round, square, or oval, by suitable molding and heating devices of novel construction, first, however, preferably gumming one edge of the paper strip before it is passed through the formers or guides, drying or setting the glue during the process of molding the tube or in the coating-box, as hereinafter shown, cutting the finished tube into suitable lengths, coating the same with waterproofing or other composition, and, finally, assembling the finished tubes in convenient form for packing.

It may be desirable at times to produce continuous tubing varying from a few inches to many feet in length. This we can accomplish by arranging the cutting-off mechanism, as herein fully shown, to produce such result. The tubes may, if desired, be made in great lengths by means of a "former," "folder," and mold and may be subsequently coated with a waterproofing composition or treated in any way desired, after which they may be cut up into predetermined lengths, singly or in numbers, by a suitable cutter, preferably a guillotine-blade, made to shear along the edge of a plate through the openings in which the tubes are allowed to project. It is also evident that our system of first forming the tube and then permanently molding or setting it into shape by heat enables us for some purposes to dispense with the gluing process altogether.

To carry out the objects of our invention, we have devised a machine adapted for the successive operations of gumming, forming, molding, cutting, and coating, if so desired, the tube by a continuous series of successive operations. To do this, a continuous paper strip is fed from a suitable roll over guides past a gluing device, which deposits a thread-like line of cement or paste along one edge of the strip, which then traverses a mandrel surrounded by a former, which directs the strip, partly folds it, and determines the location in the mold, as hereinafter described, of the edge of the gummed seam or lap of the tube. This former is preferably a block having a U-shaped slot formed therein, set upon or fixed around the mandrel in such way that it can be readily turned or moved longitudinally thereon, the paper passed through the U-shaped slot being thereby guided at the proper curve or angle into a folder, where it receives its tubular form, with the gummed edge overlapping the opposite unpasted one. From the folder the tube surrounding the mandrel passes into a heater, ironer, mold, or matrix, where it is set into permanent form, and in which at the same time the paste or cement, if used, may be dried by the heat, this latter operation being, however, incidental to the more important function performed by this part of the machine of "molding" or "setting" the tube, the mold being sufficiently heated to substantially soften the sizing or other material contained in the paper, and thus set the same into the required shape. After the tube is thus formed, or before the final heating process, if desired, it traverses reciprocating feed-clamps, which at each revolution of the machine draw the paper forward a predetermined distance, which may be regulated by well-known adjustments imparted thereto. If the tube is to be cut into uniform lengths, it is caused to pass through an opening in the cutter-support, where it is severed by a suitable knife, after which the severed tube receives its coating of waterproofing or other composition and is finally ejected upon a traveling band or other device and carried to some convenient point for boxing, or it may be caught in any suitable receptacle for the same purpose.

By applying a counter to the cutting-off mechanism the finished tubes may be automatically counted and assembled in fixed quantities for packing.

By opening the clamping device and detaching the knife the other steps of the process may be carried out independently, the tube being drawn through the several guides and folders by hand or otherwise, to be subsequently treated and severed, if desired.

Our preferred form of feeding device consists of two clamps of any desired length, grooved to fit the tube, which when brought together almost completely encircle the tube. The lower clamp, to which the driving power is applied, is supported on rollers traveling in grooves formed in suitable guideways. It slides back and forth horizontally below and preferably just touching the paper tube which surrounds the mandrel. Two vertical pins are set in the lower clamp, one in each end, which pass through openings in the upper clamp, light spiral springs being fixed upon them to hold the upper part clear of the tube during the backward stroke. A cam-wheel at the proper time operates a bell-crank lever connected to two other bell-crank levers pivoted above the clamps and connected near each end to a bar which rests upon eight rollers fixed on the upper half of the clamp, forcing the upper part downward until its lower grooved surface rests upon the top of the tube, thus clamping the paper between the upper and lower parts, when it is carried forward by the movement of the pivoted segment the required distance. The pressure on the upper section of the clamp is then immediately relieved and the clamp returns to its original position. The pressure of the clamp upon the paper tube is regulated by thumb-screws or other similar devices.

Another method of applying the clamp feeding device consists in swiveling or pivoting the clamp-sections upon links the centers of which are pivoted to a slide-bar. When power is applied by the pivoted segment and the lever connections to the lower clamp, the links will rock on their central pivots, thus opening or closing the clamps and carrying the slide-bar backward or forward, according to the direction of the motion. To prevent unnecessary pressure upon the tube and mandrel in this modified form of feed mechanism, a set-screw or other adjusting means is employed, by which the movement of the upper clamp to grasp the tube is regulated, thus preventing the clamps from holding the tube so tightly as to cause undue friction on the mandrel. When the clamps are to return to the position where they are again to clamp the tube, the links are so pivoted as to hold the two clamps at the greatest distance apart.

By changing the position of the parts we can form and set the tube without the aid of the mold or heater herein described, as the heat required to keep the coating composition fluid is sufficient for this purpose; but we prefer the arrangement above described.

The heat of the mold is sufficient to cause any accidental surplus of glue which may be deposited upon the paper strip to boil out through the seam, and thus glue the paper to the inside of the mold were the latter a complete cylinder. To avoid this, we preferably make the mold or heater in two parts, with the upper part hinged upon the lower part. The upper part when let down does not quite complete the circle, but leaves a small horizontal space along which the seam in the tube is made to pass. This is accomplished by the U-shaped movable guide, which we call the "former" and which constitutes an important feature of our invention. If, however, the tube is drawn continuously through the machine, to be afterward cut up, the coating-box may also answer the purpose of a mold, as suggested. We preferably extend the mandrel so that the end of it is coincident with the plane of movement of the knife, so that the tube is supported on all sides during the process of severing or cutting off.

The accompanying drawings show so much of one form of an improved apparatus for carrying out the objects of our invention as is necessary to illustrate the subject-matter claimed.

Unless otherwise specified, the different parts of the apparatus, broadly considered, are of usual well-known construction, the apparatus consisting of the novel organizations and combinations of instrumentalities hereinafter specified. The feed end is hereinafter called the "front" of the machine and the discharge end the "rear."

Much of the mechanism hereinafter mentioned, broadly considered, is shown in our applications for Letters Patent of the United States, Serial No. 714,892, filed April 28, 1899, and Serial No. 715,710, filed May 5, 1899, and is of course not herein broadly claimed.

Bolted to the feed end of the bed-plate Y is a standard X, extending in a vertical direction and in this instance wide enough to support two sets of guiding and pasting devices. Projecting forwardly from the standard are two arms $x$, carrying a shaft on which a roller A turns. (See Figs. 1, 2, 3, 4, and 5.) A plate B, bolted to the arms $x$, is provided with notches $b$, constituting guides by means of which the paper strips $a$ passing from a suitable roll or reel (not shown) over the roller A are guided and maintained in proper relation to the primary forming device, hereinafter described. Secured to the standard X, vertically over each paper strip, is a bracket $C'$, perforated and threaded at its outer end, through which a glue-holder $C^2$ passes, a screw-thread being formed thereon to engage with the thread in the bracket $C'$. The lower end of each glue-holder is of conical form, as shown at $c$, perforated at its apex, as at $c^2$, a screw-top $C^3$ covering the holder.

Passing axially through each glue-holder $C^2$ is a valve-stem $C^4$, pointed at its lower end to form a valve for regulating the outflow of glue through the small opening $c^2$ or to entirely cut off said flow. The upper end of said valve-stem is threaded into the cap $C^3$ and terminates in a thumb-nut $c^4$, by turning which the amount of glue allowed to pass through the opening $c^2$ is accurately regulated. Each bracket $C'$ is secured to the standard X by means of a thumb-screw $c^5$, which will permit the lateral adjustment of the glue-holder about the screw as a pivot with relation to the paper strip. To obtain the best results, the glue should be applied to the paper strip in a very fine thread-like form near one edge, for which purpose the bracket $C'$ is made horizontally adjustable, as above described.

The vertical movement of the valve-stem $C^4$, as hereinbefore stated, regulates the quantity of glue deposited on the paper strip, while the bracket $C'$ being adapted to move laterally the exact position where the glue is to be laid on the paper strip is easily determined. The quantity of glue on the paper is regulated by the said valve and by the distance separating the paper strip from the apex of the glue-holder, which distance is adjusted by screwing the holder up or down, increasing or decreasing the distance between said paper strip and the bottom of the holder $C^2$.

Another advantage of screwing the glue-holder into the bracket is that whenever the glue becomes hard or gummy or when it is found necessary to cleanse the parts a few turns of the holder will separate it from the bracket $C'$, and a new holder, ready charged, can be inserted in its place at a moment's notice.

Each paper strip passes from the guide $b$ along the under side of a mandrel D, mounted on the frame in a manner hereinafter described, so as to maintain its proper relation to the axis of the tube-forming devices, while permitting its endwise adjustment relative to the cutters and through what we term a "former." This former is shown as formed in a block E of metal, perforated, so as to turn freely as well as to move longitudinally upon the mandrel, on which it is directly mounted without other support. A set-screw $e'$, passing through this block, bears on the mandrels and clamps them securely together in the desired relation.

Figure 6:
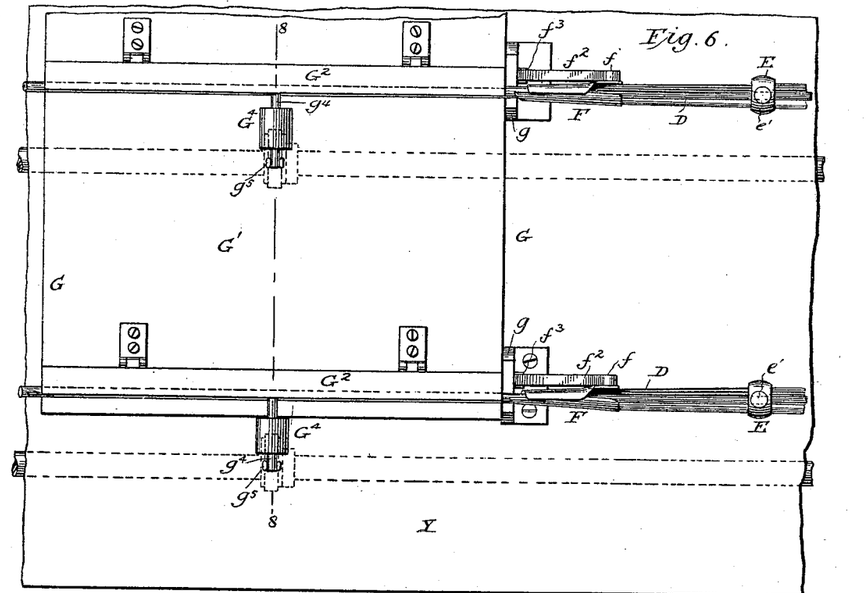
Figs. 6 and 7 respectively represent a plan and an elevation of the forming, folding, molding, and heating mechanism.
Figure 7:
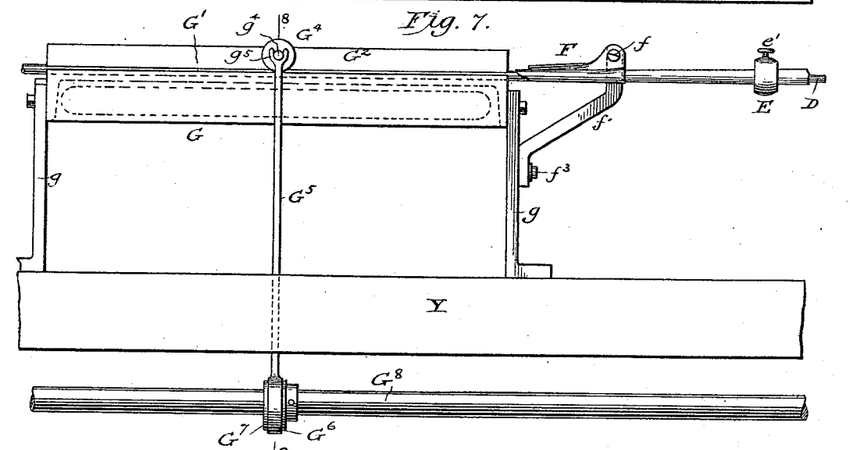

The former proper consists of a tapering U-shaped perforation $e$, formed centrally in the block, with its center below the mandrel and its horns extending above it on each side. (See Figs. 10 and 11.) The set-screw $e'$ above mentioned enables this perforation or former to be set in the desired relation to the folder F, hereinafter described. Among the advantages incident to this organization are a simple and effective means of adjusting the former on the mandrel, while leaving an unobstructed space around it for the passage of the strip, and of securing the proper relation between the former, folder, and heater. As will be seen from Fig. 11, the U-shaped slot $e$ is tapered inwardly in the direction of movement of the paper strip. The slot is also enlarged at one end, as at $e^3$, Fig. 10, to allow the glued edge of the strip to pass through it without danger of the glue being deposited in the slot. After passing through this former each paper strip enters a folder or guide F, Figs. 6, 7, and 9. This folder, which is of well-known form, is pivoted at $f$ to an arm $f^2$, which in turn is pivoted at $f^3$ to one of the standards $g$, bolted to the bed-plate and which serve to support the heater. The pivots $f\,f^3$ are loose connections, which will allow the folder F to adjust itself to any position with relation to the mandrel, the former, and the heater G as the strip passes to it from said folder. The mandrel is preferably slightly reduced in size at the narrowest point in this folder, so that the tube as it subsequently passes through the heater is made to fit closely around the mandrel.

Figure 8:
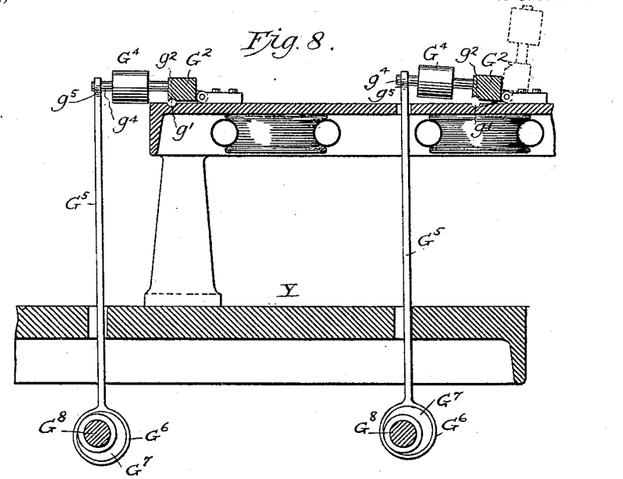
Fig. 8 is a cross-section on the line 8 8 of Figs. 6 and 7.

The heater G is formed of a horizontal plate $G'$, secured to and above the bed-plate by standards $g$. A semicircular groove $g'$, Fig. 8, is formed in the plate $G'$ beneath and partly surrounding each mandrel D, which extends longitudinally across the plate $G'$. Hinged to the plate $G'$ on each side is a bar $G^2$, the lower edge of which is provided with a groove $g^2$, somewhat less than a semicircle, encircling the top of the mandrel, the said groove having a similar radius to the groove in the plate $G'$. (See Fig. 8.) In the drawings a circular tube, with mandrel, guides, &c., is shown; but obviously any other shape may be employed.

Figure 15:
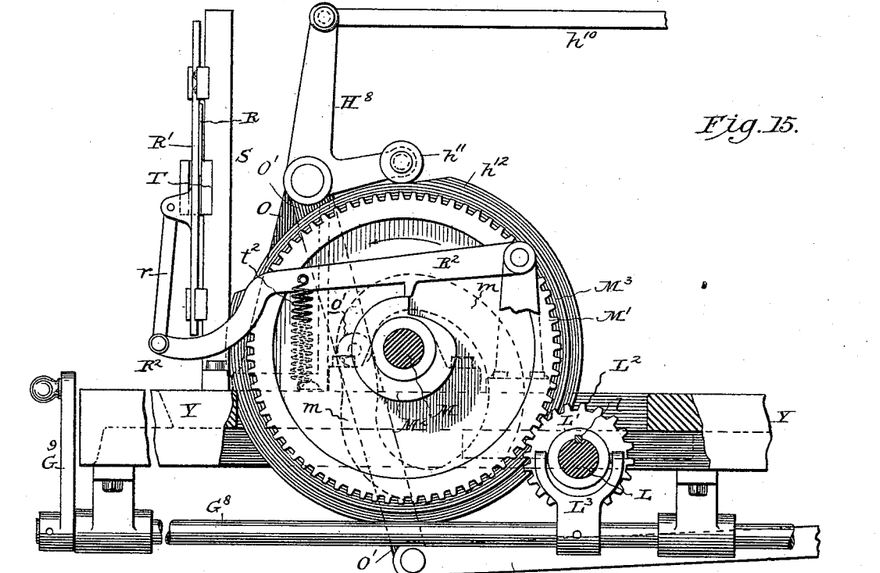
Figs. 15 and 16 show, respectively, a longitudinal sectional elevation and plan of the cutting-off mechanism.
Figure 16:
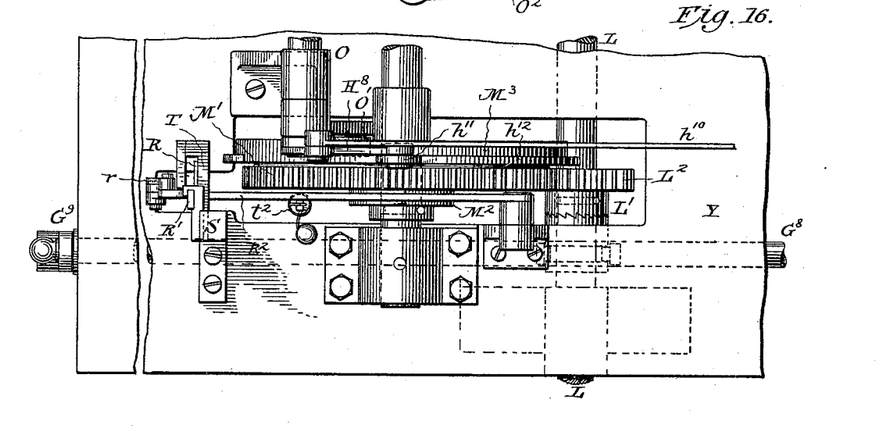

Each paper strip entering the folder F emerges therefrom in the form of a tube, the glued edge of the strip overlapping slightly the opposite edge. The tube thus formed and surrounding the mandrel D enters the grooves $g'$ $g^2$ of the mold or heater, where it is set in its tubular form and the glued edge dried. The relation of the grooves $g'$ $g^2$ is such that a slot or opening is left at their outer edges, for a purpose to be hereinafter described. An arm $g^4$ projects from the side of each bar $G^2$, opposite the hinges, and carries a weight $G^4$, which serves to apply the necessary pressure to the folded tube. The outer end of the arm $g^4$ rests in a fork $g^5$ on the upper end of a rod $G^5$, the lower end of which arm is formed into an eccentric-strap $G^6$, encircling an eccentric $G^7$ on a rock-shaft $G^8$, said shaft being provided with handles $G^9$ and $G^{10}$ at the rear and front ends of the machine, (see Figs. 1, 15, and 16,) so that from either end any one of the tube formers and feeders can be thrown out of action, while the rest of the machine continues in operation.

When it is desired to raise the bar $G^2$ for the purpose of "threading the machine" or inserting the tube into the grooves $g'$ $g^2$, the shaft $G^8$ is rocked by means of either of the handles $G^9$ $G^{10}$, thus turning the eccentric $G^7$ and raising the bar $G^2$, as shown on the right of Fig. 8, and at the same time operating the clutch mechanism and throwing this particular former out of action in the manner hereinafter described. The grooves $g'$ $g^2$ may be cleaned by throwing the bar entirely back, as shown in dotted lines in said Fig. 8. Heat is applied to the plate $G'$ by a gas or gasolene burner or any other suitable method. We prefer, however, to use electricity for this purpose, as the degree of heat can be easily regulated and a constant temperature maintained.

Figures 9, 10, 11, 12:
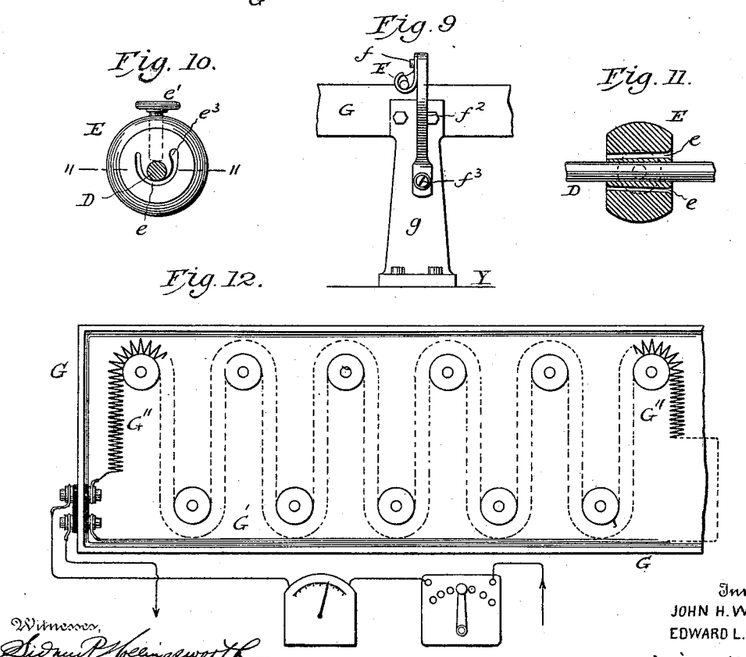
Figs. 9, 10, and 11 show detail views of the former and the folder, with their adjusting mechanisms.
Fig. 12 represents a bottom plan view of the electrical heater preferably employed.

One form of electrical heater is shown in Fig. 12, in which a current from a generator passes through a resistance-box and an ammeter, thence to the heating-coil $G^{11}$, beneath the plate $G'$, and back to the generator.

Figure 1:
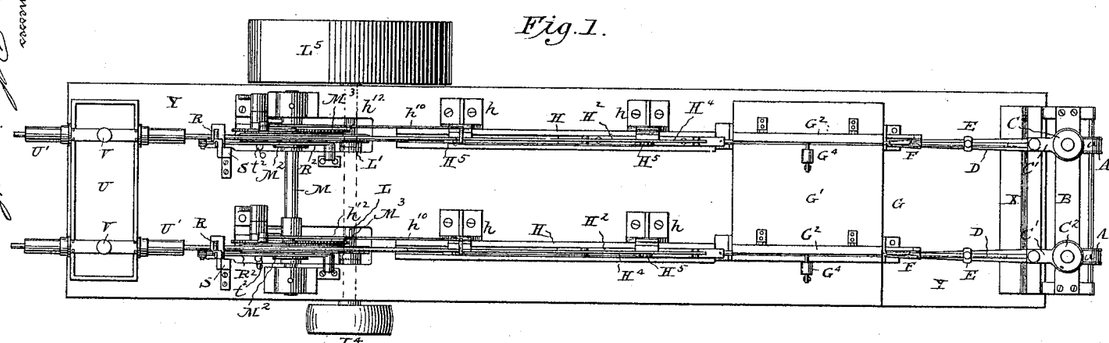
Figure 1 is a plan or top view of an apparatus adapted for making two tubes simultaneously and may obviously be extended to produce any desired number.
Figure 2:
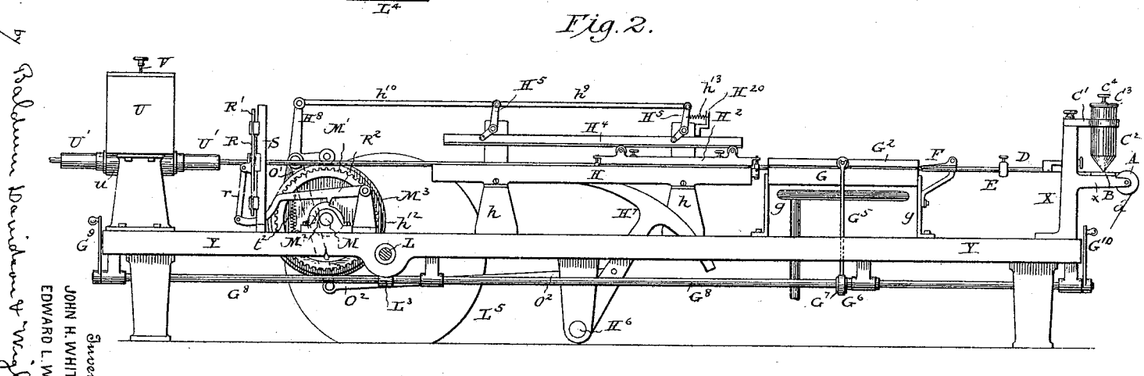
Fig. 2, a side elevation thereof.
Figure 3:
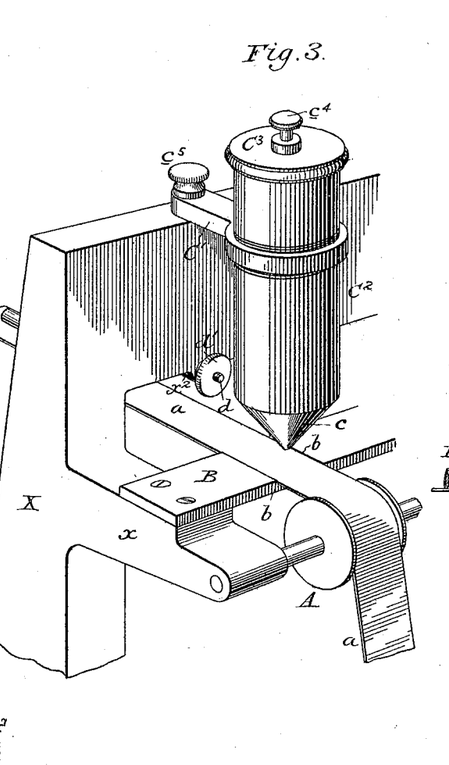
Figs. 3, 4, and 5 show the details of the pasting device employed by us, Fig. 3 being a perspective, Fig. 4 a vertical central section, and Fig. 5 a plan or top view, thereof.
Figure 4:
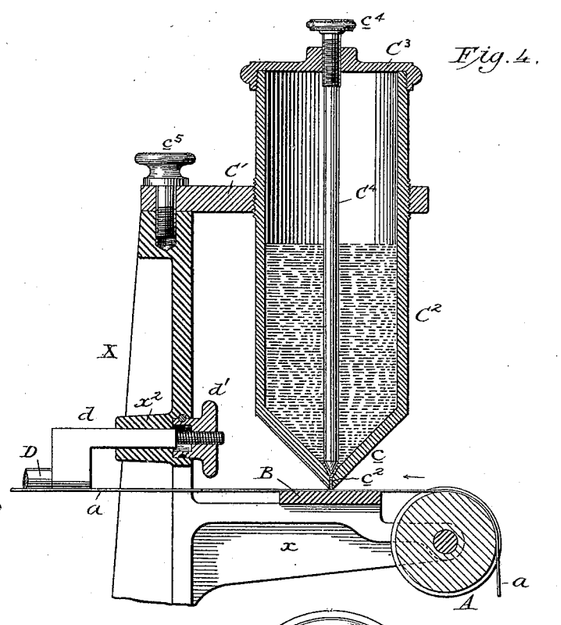
Figure 5:
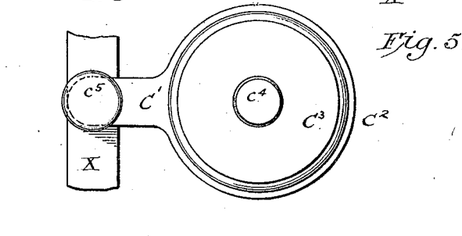

Figs. 1 and 2 show the paper strip as it passes from the heater to a clamping device, which we will now describe.

Figure 13:
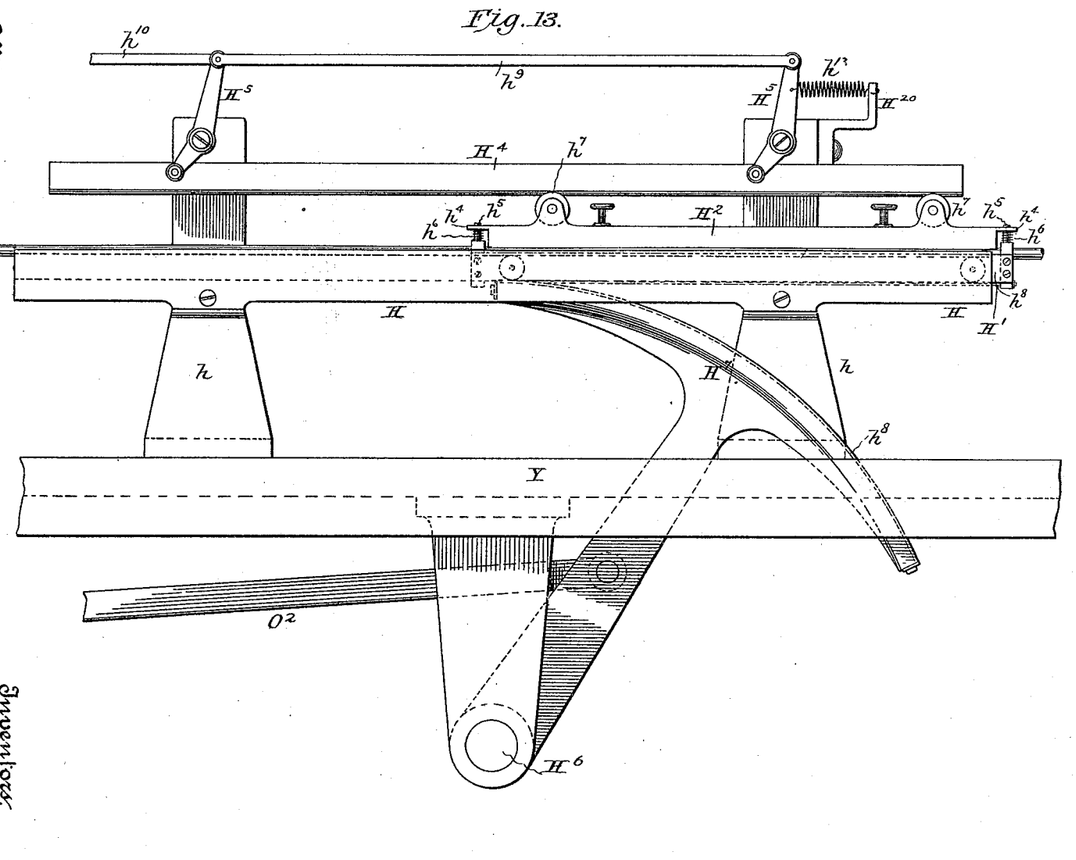
Figs. 13 and 14 are, respectively, views in side elevation and cross-section of the preferred form of feeding mechanism.
Figure 14:
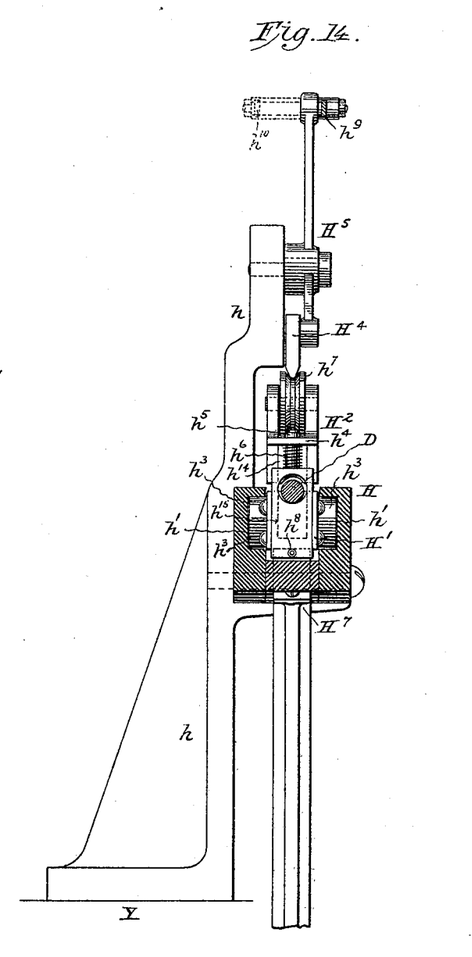
Figures 23, 24, 25, 26, 27, 28, 29:
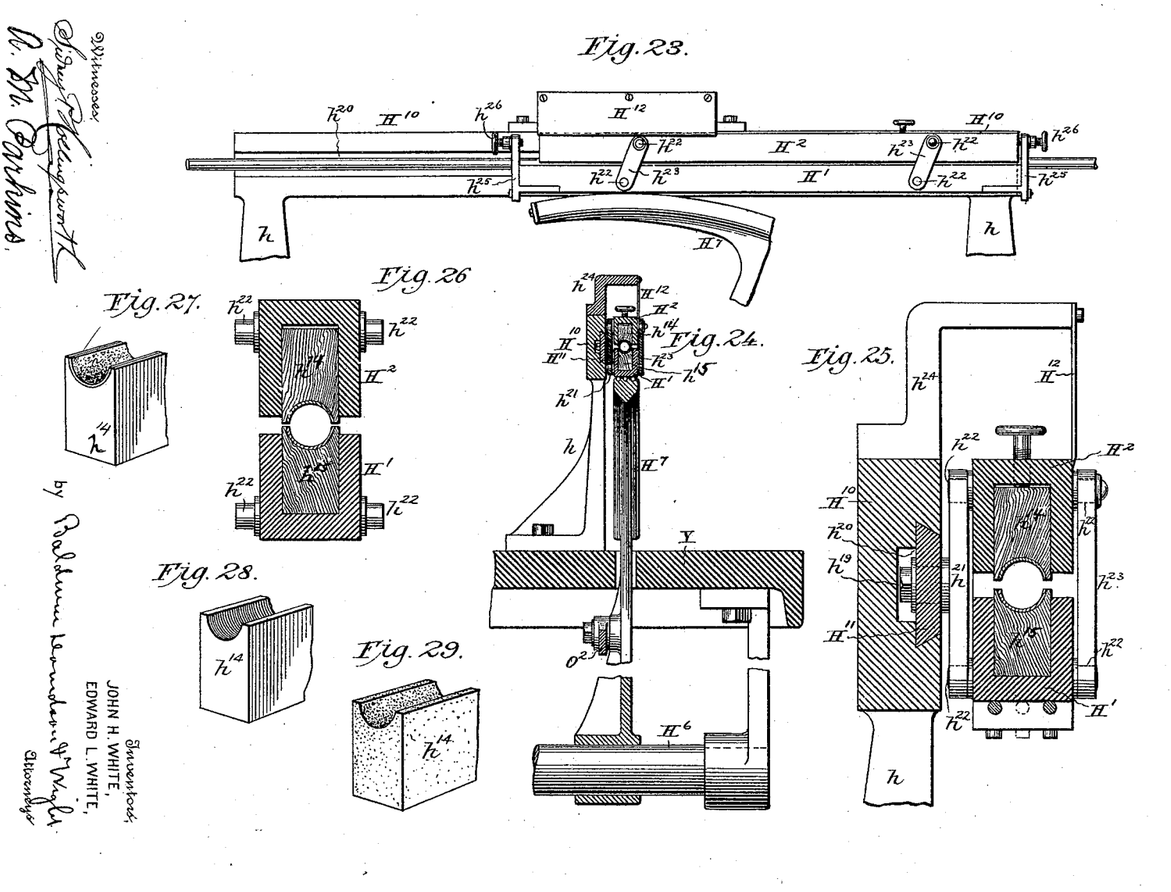
Figs. 23 to 29, inclusive, show modifications of the feeding devices.

Brackets $h$, bolted to the bed-plate Y, support on each side of the apparatus a guideway H, the inner sides of which are grooved, as at $h'$, Fig. 14. Within this guideway slides the lower clamp H', supported by rollers $h^3$, which run in the grooves $h'$. The upper clamp $H^2$, Fig. 13, which lies vertically above the lower clamp, is provided with a projecting ear $h^4$ at each end, perforated to receive a pin $h^5$, extending upwardly from each end of the lower clamp H'. Surrounding each pin between the two clamps is a spiral spring $h^6$, which affords a yielding support for the upper clamp $H^2$ and tends at all times to keep the clamps separated. The upper face of the lower clamp is grooved semicircularly (see Fig. 14) and fits closely against the formed paper tube surrounding the mandrel D, which passes between the clamps. The lower face of the upper clamp is also grooved, but is normally held out of contact with the tube by the springs $h^6$. Grooved rollers $h^7$, journaled to the upper side of the clamp $H^2$, bear on a bar $H^4$, hung to one arm of each of two bell-crank levers $H^5$, pivoted to the standards $h$, their other arms being connected by a link-rod $h^9$. A cross-shaft $H^6$, below the clamps, Fig. 13, has journaled on it as many segments $H^7$ as there are tubes to be formed, by means of which the clamps are moved endwise and the tube fed through the machine. One or more cords $h^8$ are fastened to the lower clamp H' and to the segment $H^7$ in such way that as the segment $H^7$ rocks to and fro the clamps will be carried back and forth, as described. A rod $h^{10}$ extends from one of said levers $H^5$ to a bell-crank lever $H^8$, to one arm of which is pivoted a roller $h^{11}$, (see Fig. 15,) acted on by a cam $h^{12}$, turning on a shaft M. As the cam rotates it will at the proper time rock the bell-crank lever $H^8$ and pull the rods $h^{10}$ $h^9$ and depress the ends of the bell-crank levers $H^5$, carrying the bar $H^4$. This downward movement of the bar $H^4$ forces the upper clamp $H^2$ downward into contact with the formed paper tube surrounding the mandrel D, clamping it between the two clamps H' $H^2$. At this instant the segment $H^7$ is moved forward, feeding forward a length of tube. As soon as the stroke of the segment $H^7$ is ended the bell-crank lever $H^8$ will be disengaged from the cam and the bar $H^4$ raised by the spiral spring $h^{13}$, connected to the forward bell-crank lever $H^5$ and to a bracket $H^{20}$, on the right of Fig. 13. The clamps H' $H^2$ each contain a block $h^{14}$ $h^{15}$, which blocks engage the tube when the clamps are brought together. The grooved surface of the lower block $h^{15}$ is preferably smooth, while the corresponding surface of the upper block $h^{14}$ is roughened either by securing in the groove a strip of emery-paper or by making the block of corundum, which is naturally rough, or of steel having ribs formed therein. (See Figs. 27, 28, and 29.)

A driving-shaft L, extending beneath the bed-plate Y, carries a driving-pulley $L^4$ at one end and a balance-wheel $L^5$ at the other, is supported by suitable bearings, and has mounted thereon on each side one section of a two-part clutch L', adapted to slide longitudinally on the shaft and rotate therewith by means of a feather and groove $l$. (See more particularly Figs. 15 and 16.) The second part of the clutch L' is formed on the hub of a pinion $L^2$. This portion of the clutch is adapted to rotate on the shaft, but is fixed against longitudinal movement by any suitable means.

A gear-wheel M' on each side of the machine, turning freely on the fixed shaft M, heretofore mentioned, engages with and is rotated by the pinion $L^2$. Secured to the gear-wheel M' is a cam $M^2$ and a cam-disk $M^3$, in one face of which is a groove $m$, while around its periphery is the cam $h^{12}$, heretofore referred to. Affixed to the rock-shaft $G^8$ is a fork $L^3$, adapted to disconnect the clutch when the shaft $G^8$ is rocked.

Pivoted in suitable bearings O, bolted to the bed-plate on each side, is a lever O', extending in a downward direction to a point beneath the bed-plate, where it is connected to a bar $O^2$, the upper end of which is pivoted to the segment $H^7$. A roller $o'$ on the arm O' enters the cam-groove $m$ on the disk $M^3$ and is rocked to and fro as the disk $M^3$ rotates. This movement causes the segment $H^7$ to oscillate and move the feed-clamps to and fro, the cam being so shaped that the movement of the segment is slowest at the start and finish of the stroke.

The external cam $h^{12}$, as heretofore described, operates the bell-crank lever $H^8$ for closing the upper clamp $H^2$ on the tube.

Figure 17:
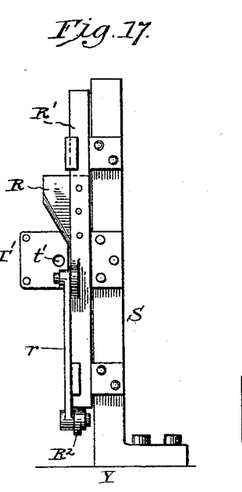
Fig. 17 is a detail view of the same.
Figure 18:
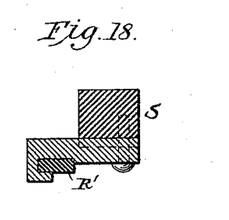
Figs. 18 and 19 are detail views of the cutting-off mechanism.
Figure 19:
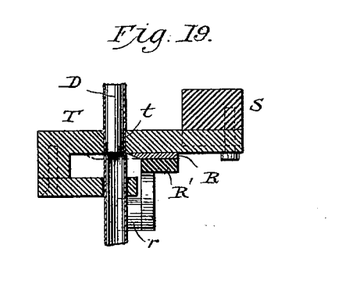
Figure 20:
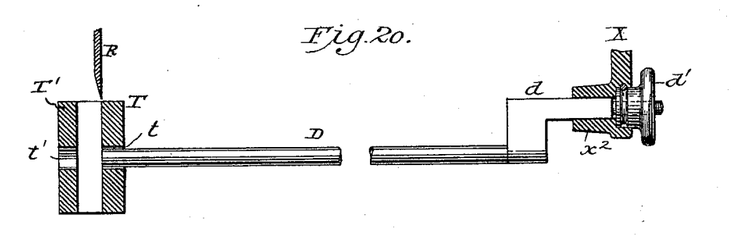
Fig. 20 is a view of the mandrel, showing the means employed for adjusting it with relation to the cutting-off mechanism.
Figure 21:
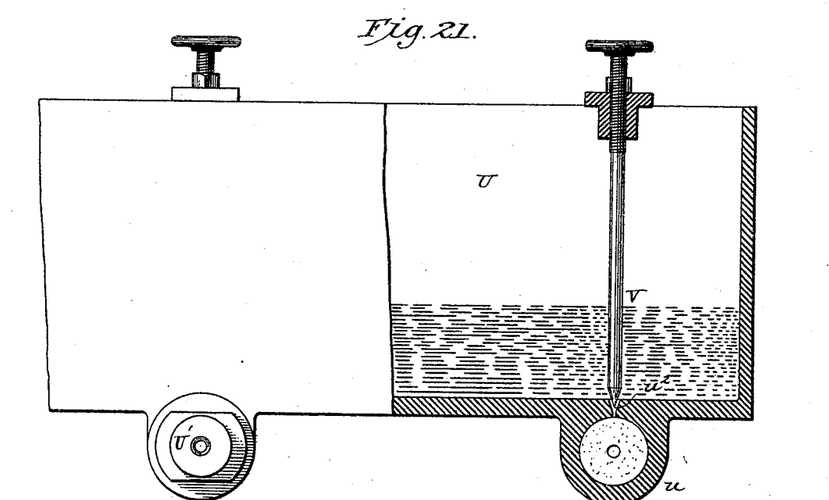
Figs. 21 and 22 are sectional views, the former being partly in elevation, showing the paraffining apparatus or coating mechanism.
Figure 22:
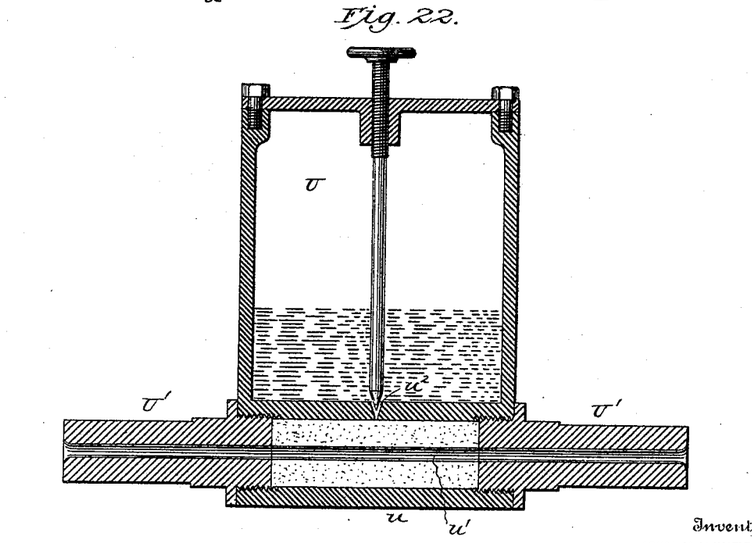

A knife R for separating each tube into equal lengths is attached to a vertical slide-bar R', Figs. 2 and 17, mounted in bearings on an upright S. It is raised by the cam $M^2$ acting on the lever $R^2$, pivoted in any convenient position and connected to the plate R' by a link $r$. The knife is drawn downward in the act of severing the tube by the spring $t^2$, attached to said lever and to the bed-plate. Extending laterally from the upright S is a plate T, having an opening $t$ formed therethrough for the passage of the mandrel and the tube. Against this plate (see Figs. 17, 18, 19, and 20) the knife R bears, it forming a ledger-plate to coact with the knife for severing the tube. The mandrel also terminates at this point. The front of the mandrel D, which extends longitudinally of the machine from the standard X to the cutting mechanism, as shown in Figs. 1, 2, and 20, is fixed to a slide $d$, adapted to move longitudinally in a boss $x^2$ on the standard X. The forward end of the slide is screw-threaded and carries a nut $d'$, by means of which the mandrel D is given a longitudinal movement, so that its rear or free end will lie always in the plane of the cutting-face of the ledger-plate T. The need of this adjustment is evident when it is understood that the rod D, being exposed to more or less varying degrees of temperature, will expand or contract, and it is for the purpose of always keeping its free end, as heretofore stated, in the plane of the ledger-plate, so that when the tube is cut by the knife R the cut will be clean and sharp.

A support T' is arranged opposite the plate T in the line of the mandrel and is provided with a passage-way $t'$, through which the paper tube passes, its cut end being thus supported in the proper position to be shoved forward by the continued movement of the tube.

Each tube after being severed is passed through a device for coating it or saturating it with paraffin. This device (shown in Figs. 1, 2, 21, and 22) consists of a receptacle or box U, of suitable size and shape, in which the paraffin is placed and kept in a molten state by any suitable heating device. In the bottom of the box is formed a socket $u$, filled with felt or other suitable substance, but having an opening $u'$, through which the tube may pass. Into the ends of the socket $u$ are screwed nozzles U', which have openings formed therethrough and in line with the opening $u'$ in the felt filling.

The bottom of the receptacle U is perforated, as at $u^2$, through which perforation the melted paraffin passes and is absorbed by the felt. A stem V, pointed at its lower end and threaded at its upper end and provided with a thumb-nut, serves to open and close the opening $u^2$ to regulate the quantity of paraffin flowing through to the felt. The tubes passing through the openings in the nozzles U' and the felt, being heated, absorb paraffin from the felt, which operation completes the formation of a drinking-straw.

In the modified form of clamping device shown in Figs. 23 to 26, both inclusive, the brackets $h$ support at their upper ends a horizontal bar $H^{10}$, in one side of which is formed a dovetailed groove $h^{20}$. Within the groove $h^{20}$ is a slide $H^{11}$, adapted to move forward and backward therein. Pivoted at its center, near each end of the slide $H^{11}$, is a link $h^{21}$, its ends extending above and below the pivotal point. Two U-shaped clamps H' $H^2$, disposed one above the other, are provided with pivots $h^{22}$ near each end, which enter sockets in the ends of the links $h^{21}$. Similar pivots on the opposite side of the clamps H' $H^2$ are connected to links $h^{23}$. A segment $H^7$, similar in all respects to the one heretofore described and connected to the lower clamp H' in a similar manner, carries the clamps H' $H^2$ backward and forward to feed the formed paper tube to the cutting mechanism.

The arrangement of the above-described parts is such that as the lower clamp H' moves forward the links $h^{21}$ rock on their pivots $h^{19}$, thus raising the lower clamp H' and depressing the upper clamp $H^2$ into engagement with the formed paper tube and draw it forward. A reverse movement of the segment $H^7$ will cause the clamps to open and return to their retractive position. Attached to a bracket $h^{24}$, bolted to the top of the horizontal bar $H^{10}$, is a plate $H^{12}$, the lower edge of which forms a guide and support for the upper clamp $H^2$. Fixed to each end of the lower clamp H' is a plate $h^{25}$, extending upwardly and carrying a screw $h^{26}$, which forms a stop for the upper clamp $H^2$ and by which the pressure on the formed paper tube is regulated. The clamps H' $H^2$ each contain a block $h^{14}$ $h^{15}$, similar to the blocks described in the preferred form of feeding device.

We have shown and described an apparatus organized to simultaneously form, cut, and coat two tubes; but a single tube or a larger number may be thus formed and treated.

We do not herein claim, broadly, the art of making paper tubes consisting in folding a paper strip into tubular form and then heating the tube to soften the sizing and set the paper permanently in tubular form, nor, broadly, the apparatus for this purpose, as such art and apparatus are claimed in our applications for patent, No. 714,892, filed April 28, 1899, and No. 741,314, filed December 22, 1899. Nor do we claim, broadly, the art or method of applying pressure in connection with the heating in such an art or machine, nor, broadly, applying waterproofing or strengthening material to the tube thus formed, as these features are claimed in our applications for patent above mentioned, the latter of which applications also claims, broadly, means for forming a tube from a paper strip, a hollow matrix, a mandrel extending therethrough, and means for heating the matrix. Nor do we claim herein, broadly, gumming mechanism, tube-forming mechanism, a heater, and a mandrel passing therethrough, nor the combination of gumming mechanism, tube-forming mechanism, a heater, and a coating device, as such subject-matter is claimed in our application for patent, No. 715,710, filed May 5, 1899, which application also claims, broadly, the combination of gumming mechanism, tube-forming mechanism, a heated chamber through which the gummed tube passes, and a mandrel within the heated chamber which the tube traverses.

What we claim herein as new, and as of our own joint invention, is—

1. The gumming apparatus herein described, comprising a holder with a conical mouth, a regulating-valve working therein, an arm swinging laterally around its support, a clamp-screw to hold it in place, and a screw-joint between the arm and holder to permit the holder to be adjusted both vertically and laterally relatively to the strip to be gummed and to the tube-forming devices.

2. The "former" herein described, supported solely by and adjustable upon the mandrel.

3. The "former" herein described comprising a block having a U-shaped perforation and supported solely by and adjustable upon a mandrel surrounded by the former.

4. The "former" herein described comprising a block having a U-shaped perforation having one arm or branch thereof enlarged for the unobstructed passage of the gummed paper strip.

5. The "former" herein described, comprising a block having a U-shaped perforation tapering from rear to front and having one of its arms or branches enlarged for the unobstructed passage of the gummed paper strip.

6. The combination of the mandrel, the "former" supported solely by and movable thereon, and the set-screw which clamps these parts together.

7. The combination of the roller over which the paper strip passes, the fixed guide, the gumming apparatus directly over the guide and adjustable relatively thereto, the mandrel, the "former" mounted on the mandrel, and the set-screw which locks the "former" on the mandrel in proper relation to the guide and gumming apparatus.

8. The combination, substantially as hereinbefore set forth, of a mandrel, and an encircling folder pivoted to a support, in turn pivoted on a bed-plate or frame, to render the folder adjustable in two directions.

9. The "former" herein described supported solely upon and adjustable on the mandrel, in combination with the folder encircling the mandrel, and the support to which the folder is pivoted, in turn pivoted on the frame, to secure the proper relation of the strip, mandrel, "former" and folder.

10. A heater comprising sections hinged together and provided with means for varying their pressure upon the paper tube passing between them.

11. A heater comprising a hinged weighted section, means for lifting it, and means for varying its pressure upon the paper tube traversing the heater.

12. A heater comprising a fixed section and a hinged section, in combination with an actuating-shaft and a link connecting the shaft and hinged section.

13. The paper-tube-feeding device herein described, comprising a stationary mandrel traversed by the finished tube, a vibratable segment, a clamp carried thereby encircling the lower part of the tube, an upper clamp carried by the lower one, devices which normally tend to separate the clamps, and means for closing the clamps upon the tube on their forward stroke.

14. The combination of the stationary mandrel, clamp-sections embracing it, springs which normally tend to separate these clamps, a vibratable segment which traverses the clamps relatively to the mandrel, and devices for closing the clamps upon the tube carried by the mandrel on their forward stroke.

15. The combination of a ledger-plate, a mandrel terminating in an opening therein, means for adjusting the mandrel longitudinally relatively thereto, and a cutter working across the face of the mandrel to sever the tube escaping therefrom.

16. The combination, substantially as hereinbefore set forth, of tube forming and feeding mechanism, a heater, a mandrel passing therethrough, a cutter working across the face of the mandrel, and means for adjusting the mandrel longitudinally to compensate for its variations in length.

17. The combination of the gumming mechanism, the former, the folder, the heater, the feed mechanism, the cutter, the mandrel passing through the former, folder, feed mechanism and heater, terminating at the cutter, and the coating mechanism through which the severed tubes pass.

18. The coating apparatus herein described, comprising a receptacle or reservoir, its regulating-valve, the socket beneath the receptacle, its longitudinally-perforated fibrous filling, and the perforated nozzles through which and the filling the tube passes to be coated.

19. The combination of the wheel and fixed guide over which the paper strip passes, the gluing device over the guide, the stationary mandrel, the former mounted solely upon and adjustable thereon, the stationary folder, the sectional heater, the feeding device, the cutter, and the coating-chamber, the organization being such that the mandrel extends through the former, folder, heater and feeding device and terminates at the cutter.

In testimony whereof we have hereunto subscribed our names.

JOHN H. WHITE.
EDWARD L. WHITE.

Witnesses:
W. D. BALDWIN,
WALTER R. TUBBS.